July 19, 1938.   G. W. GWINN ET AL   2,124,397
CIGARETTE CATCHER
Original Filed Nov. 20, 1934    4 Sheets—Sheet 1
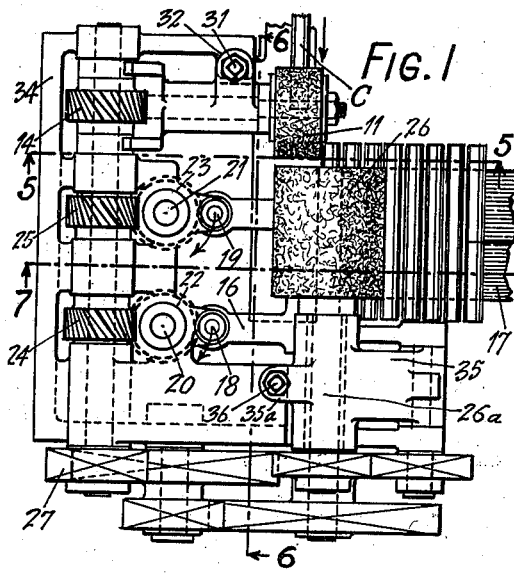
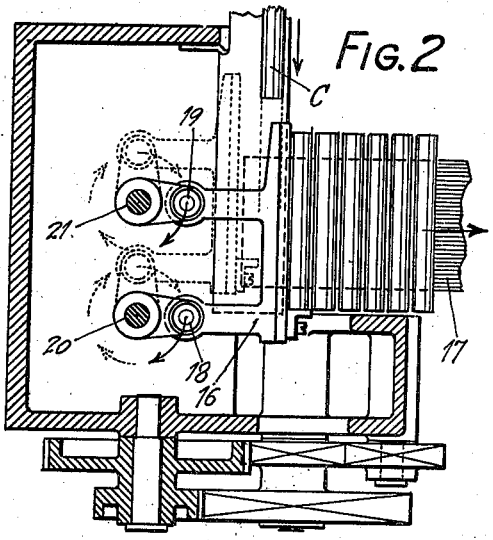
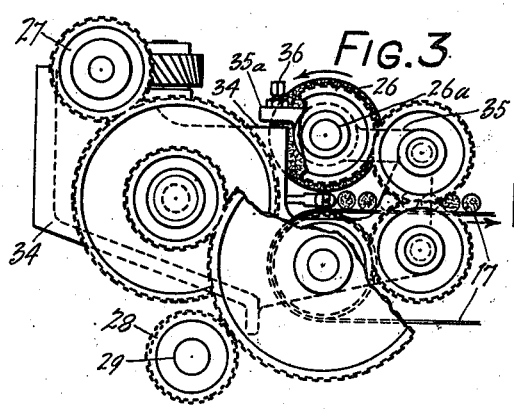
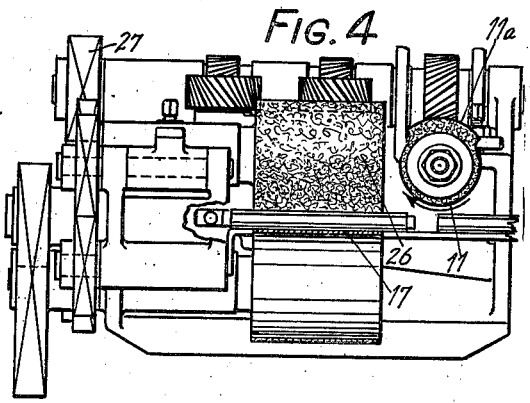
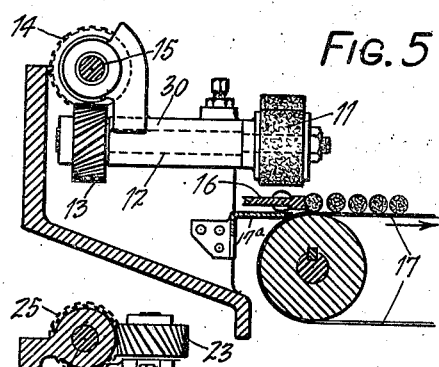
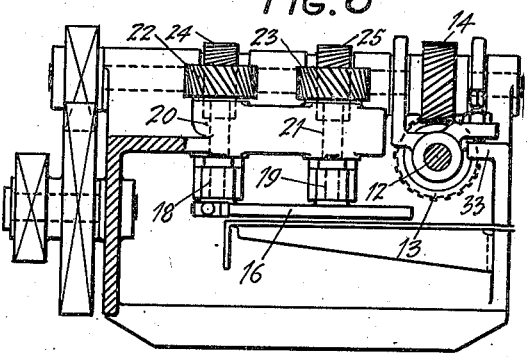
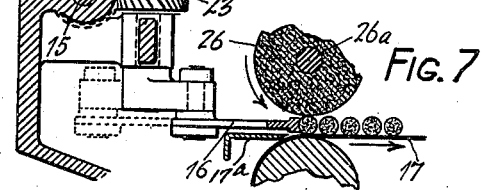
INVENTOR
George W. Gwinn
BY James W. Leary
Sydney J. Prescott
ATTORNEY July 19, 1938.    G. W. GWINN ET AL    2,124,397
CIGARETTE CATCHER
Original Filed Nov. 20, 1934    4 Sheets-Sheet 3
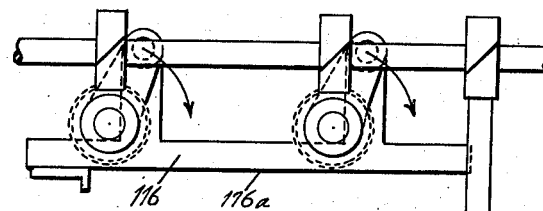
FIG. 16
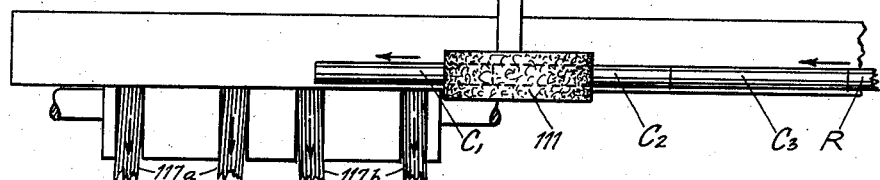
FIG. 17
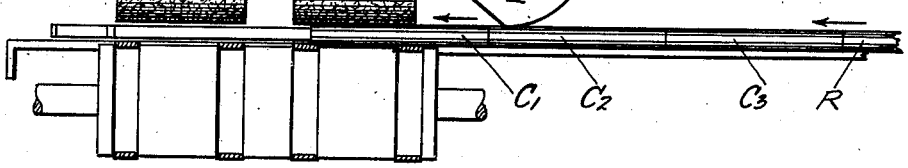
FIG. 18
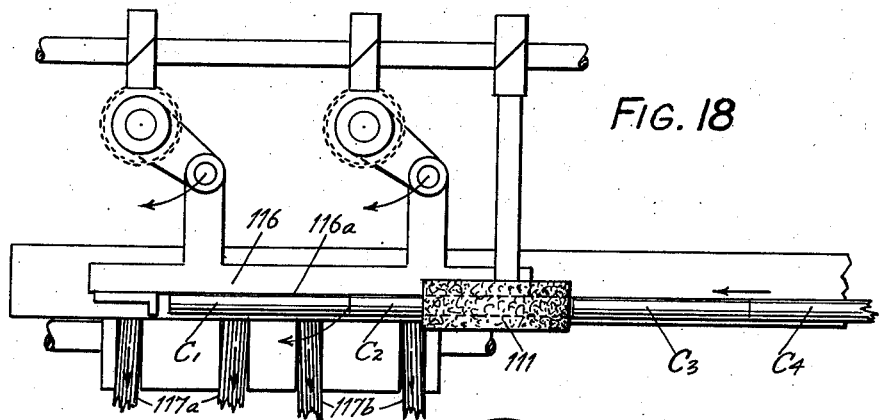
FIG. 19
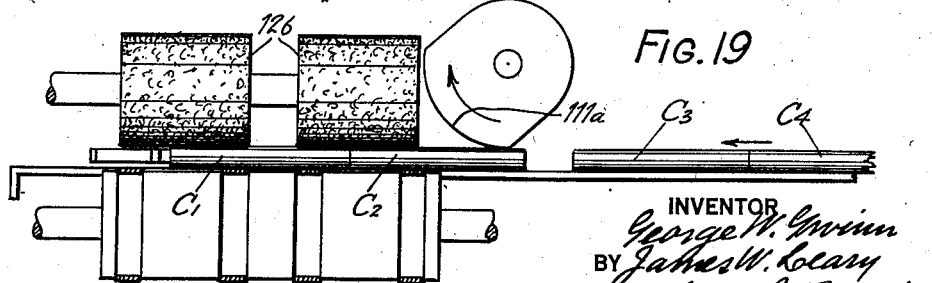
INVENTOR
George W. Gwinn
BY James W. Leary
Sydney J. Prescott
ATTORNEY

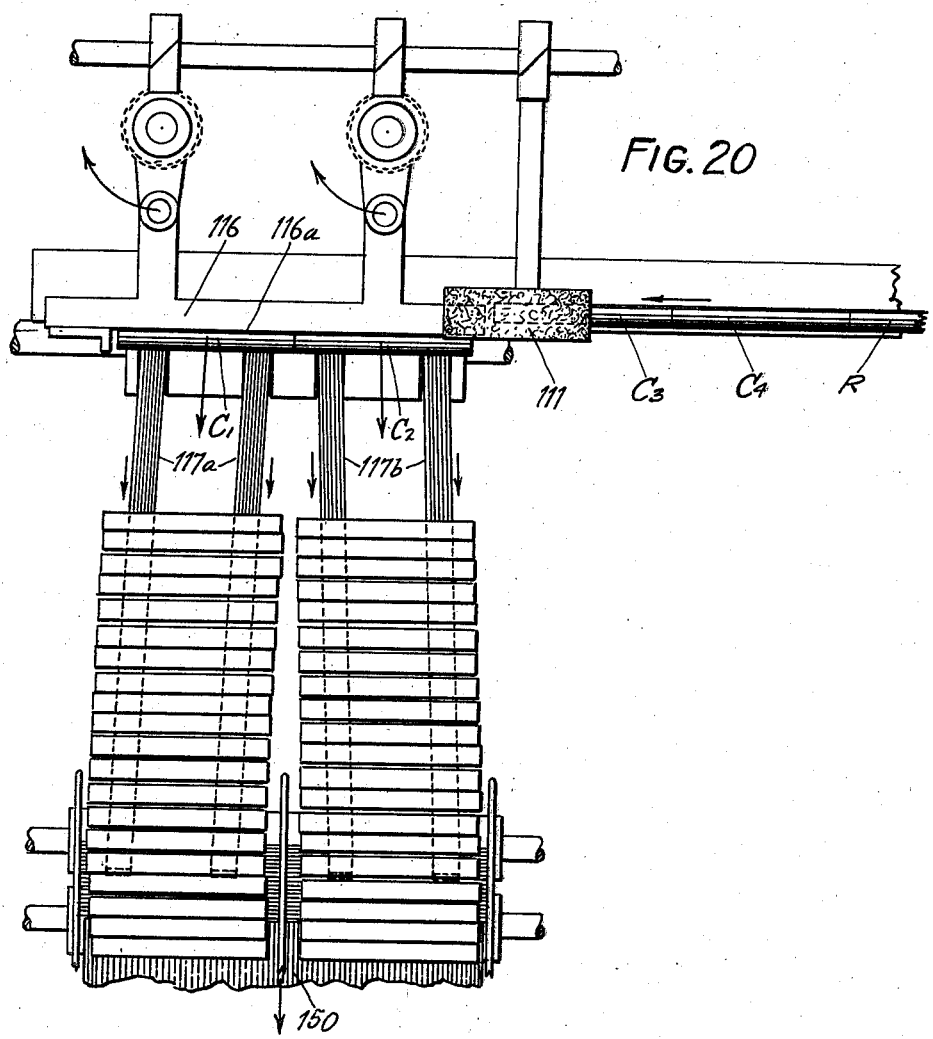

Patented July 19, 1938

2,124,397

UNITED STATES PATENT OFFICE 2,124,397

CIGARETTE CATCHER

George W. Gwinn, Hewlett, N. Y., and James W. Leary, Bloomfield, N. J., assignors to American Machine & Foundry Company, a corporation of New Jersey Application November 20, 1934, Serial No. 753,986
Renewed August 4, 1936

33 Claims. (Cl. 198—24)

This invention relates to an improvement in cigarette machine catchers or collectors of the type intended to receive the cigarettes in a single file from the cigarette machine cutoff and deliver them in side-by-side row formation.

Among the objections to the devices now in use for this purpose are their size and complicated operating mechanism; some employing a suction drum to retard the endwise movement of the cigarettes and transfer them to the collecting belts and others depending on centrifugal force, involving the use of large and cumbersome rotating parts and requiring close adjustments and careful attention. The complicated construction of these devices, with their attendant disadvantages has heretofore been deemed necessary to efficiently collect the cigarettes at high cigarette machine speeds without injuring their ends.

In the present invention these disadvantages have been avoided, the mechanical parts being very simple and requiring no special adjustment for proper operation. The main object of the invention therefore is to provide a collector which is free from these objections and capable of successfully operating at the highest cigarette machine speeds attainable, which at the present time is in the neighborhood of 2500 cigarettes per minute. To this end, in the preferred embodiment of the invention, each cigarette, after having been cut off from the cigarette rod, is pushed along by the cigarette rod until it passes under a rotating "speed-up" roll having a raised segment which engages the cigarette and causes it to speed up, thus separating it from the cigarette rod. When the "speed-up" roll is about to release the cigarette, a pusher having an orbital movement contacts with the side of the cigarette and pushes it sidewise between the collecting means and a traveling friction surface which are disposed transversely of the cigarette rod.

As its front face contacts with the side of the cigarette the pusher continues its orbital swing, thereby traveling with the cigarette while inserting it between the collecting means and the traveling friction surface. In one of the illustrated embodiments of the invention the traveling surface may be a friction roller and the collecting means may be a collecting belt, the friction roller being mounted above the collecting belt and rotating with a peripheral speed equal to the linear speed of the belt. This friction roller is spaced a distance above the belt slightly less than the diameter of the cigarette, so that the cigarette being pushed into said space will be gradually gripped, and its endwise or axial motion will thus be gently retarded and stopped. In this manner the longitudinal movement of the cigarettes delivered from the cigarette machine cutoff will be gently retarded and stopped without injuring the ends of the cigarettes.

A further object of the invention, therefore, is to retard and stop in a novel and more efficient manner the axial motion of the cigarettes emerging from the cigarette machine cutoff.

Without changing the principle of operation, but with minor modification of some parts of the catcher, it can be made to transfer two cigarettes at a time instead of one. The principal changes necessary would be a larger "speed-up" roll, a longer pusher operated by cranks of increased length, and double collecting belts and friction rollers.

The reason for the use of double collecting belts is that they can be arranged to diverge slightly so that the cigarettes of each pair will be separated into separate lanes as they travel towards the delivery position. This arrangement makes it more convenient for the operator to gather them in than if they were all in one lane, particularly if the cigarettes are tipped, since it is the usual practice to apply cork tips of double length to the cigarette paper strip at intervals equal to two cigarette lengths. The cigarette rod is then cut into individual cigarettes, one cut being made at the center of the applied cork strip, and another midway between adjacent cork strips. Every cork strip on the rod will therefore provide tips for two cigarettes, wherefore half of the cigarettes emerging from the cigarette machine cutoff will have tips on their leading ends and the other half will have tips on their trailing ends, and must be sorted before being packaged.

With this embodiment of the invention the cigarettes will be separated into two rows and sorted so that the tips of all the cigarettes in one row will point in one direction and the tips of all the cigarettes in the other row will point in the opposite direction.

Accordingly, still another object of the invention is to provide an improved cigarette catcher for collecting tipped cigarettes emerging from the cigarette machine cutoff and sorting them into two separate rows in which the tips all lie at the same side of the row. With these and other objects not specifically mentioned in view, the invention consists in certain constructions and combinations hereinafter fully described and then specifically set forth in the claims hereunto appended.

In the accompanying drawings which form a part of this specification and in which like characters of reference indicate the same or like parts:

Fig. 1 is a plan view of the preferred form of the improved cigarette catcher;

Fig. 2 is a sectional plan view of the same showing the operation of the pusher;

Fig. 3 is an end view (partly broken away) of the collector shown in Fig. 1;

Fig. 4 is a front elevation of the same;

Fig. 5 is a cross-section of the same on line 5—5 of Fig. 1;

Fig. 6 is a longitudinal section of the same on line 6—6 of Fig. 1;

Fig. 7 is a cross-section of the same on line 7—7 of Fig. 1;

Fig. 16 is a schematic plan view of a modified form of cigarette catcher showing the first pair of cigarettes entering the collector and about to be accelerated by the "speed-up" roll;

Fig. 17 is a front view of the same;

Fig. 18 is a schematic plan view of the alternative form of collector, showing the first pair of cigarettes about to be pushed into the space between the double collecting belts and friction rollers;

Fig. 19 is a front view of the same; and

Fig. 20 is a schematic plan view of the same showing the first pair of cigarettes after they have been gripped between the collecting belts and friction rollers, and the second pair of cigarettes passing under the "speed-up" roll.

Figure 8:
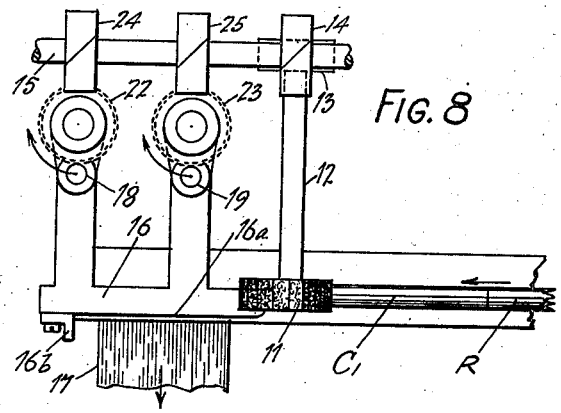
Fig. 8 is a schematic plan view of the preferred form of cigarette collector showing the first cigarette cut from the cigarette rod about to enter the collector.

In carrying the invention into effect there is provided mechanism arranged to receive cigarettes delivered lengthwise in end-to-end relation from a continuous rod cigarette machine cutoff and separate them lengthwise, collecting means arranged transversely of the line of cigarettes delivered from the cutoff, a traveling friction surface overlying the collecting means to engage cigarettes thereon, and a device for pushing the separated cigarettes sidewise between the collecting means and traveling surface, whereby the axial motion of the cigarettes is gently retarded and stopped. In the best constructions said mechanism includes a stationary plate on which the cigarettes delivered from the cutoff are guided, and a rotating roll having a segment of increased radius adapted either to engage the top of each cigarette delivered onto said plate and accelerate it to separate it from the following cigarette, or to engage the top of alternate cigarettes to accelerate and separate pairs of cigarettes from the following cigarettes; the collecting means may include a traveling endless belt or a pair of diverging endless belts, and the friction surface may include a friction roller or a pair of friction rollers, respectively; and said device includes a pair of cranks, a pusher on said cranks, and an abutment on said pusher arranged to stop cigarettes having an excessive momentum. These various means and parts may be widely varied in construction within the scope of the claims for the particular device selected to illustrate the invention is but one of many possible concrete embodiments of the same. The invention, therefore, is not to be restricted to the specific construction shown and described.

As this invention is applicable to any cigarette machine of the continuous rod type, no description of the cigarette rod forming mechanism or the cutoff is deemed necessary. The disclosure of the invention will be confined to a description of how the cigarettes, after they have been cut off from the rod, are received by the improved cigarette collector and assembled in side-by-side row formation on the collecting belt.

Referring now to the drawings, Figs. 1 to 7 inclusive, show the general construction of one embodiment of the invention. The collector shown therein is a complete unit arranged to receive cigarettes in a single file from the cigarette machine cutoff. Its drive is connected to and synchronized with the main drive of the cigarette machine.

The foremost cigarette C, Figs. 1, 2 and 3, after having been cut off from the cigarette rod, is pushed along by the rod until it passes under a "speed-up" roll 11 formed of sponge rubber and having a raised segment 11a mounted on one end of a shaft 12 carrying a gear 13 driven by gear 14 on shaft 15. At a predetermined point the cigarette will be engaged by the raised segment 11a of roll 11 and speeded up to separate it from the cigarette rod. The peripheral speed of the segment 11a on roll 11 is a predetermined amount greater than the linear speed of the cigarette rod to establish the desired separation of the cigarettes.

At the instant the segment 11a of roll 11 releases the cigarette, the pusher 16, which has been previously swung alongside the cigarette, continues traveling in its orbital path and pushes the cigarette sidewise into the space between the collecting means and the traveling friction surface. A collecting belt 17, or any other suitable type of conveyor, may be used for the collecting means, and the traveling friction surface may be provided by a rubber friction roller, as shown, or an endless conveyor. The orbital movement of the pusher bar 16 is produced by its mounting on crank pins 18 and 19 of the cranks on crank-shafts 20 and 21, respectively. On the upper ends of the crank-shafts are mounted the spiral gears 22 and 23 which mesh with spiral gears 24 and 25, respectively, on the counter shaft 15. Gear 27 on shaft 15 meshes with a train of gears, Figs. 1, 3, and 4, driven by pinion 28 on the main shaft 29 of the cigarette machine, whereby synchronism between the roll 11 and the pusher 16 and the cigarette machine is established. The friction roller 26 and the collecting unit 17 are driven at the same linear speed in a manner hereinafter described.

As the pusher 16 inserts the cigarette C between the collecting belt 17 and friction roller 26 the cigarette is gripped therebetween, thereby serving to gently retard and stop the axial movement of the cigarette without injuring its ends. Furthermore, since the cigarette is gripped between surfaces traveling at the same speed the position of its seam will not be lost.

Figure 10:
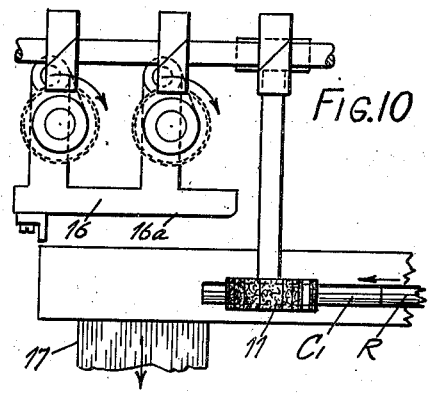
Fig. 10 is a schematic plan view of the same showing the first cigarette after it has entered the collector, and about to be engaged by the raised segment of the "speed-up" roll.
Figure 9:
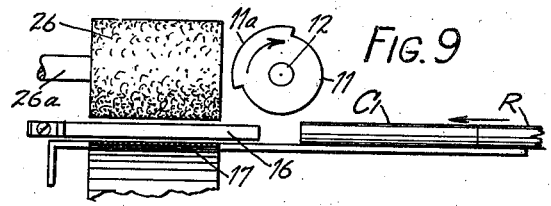
Fig. 9 is a detail front view of the same.
Figure 11:
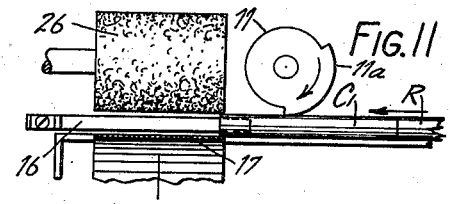
Fig. 11 is a front view of Fig. 10.
Figure 12:
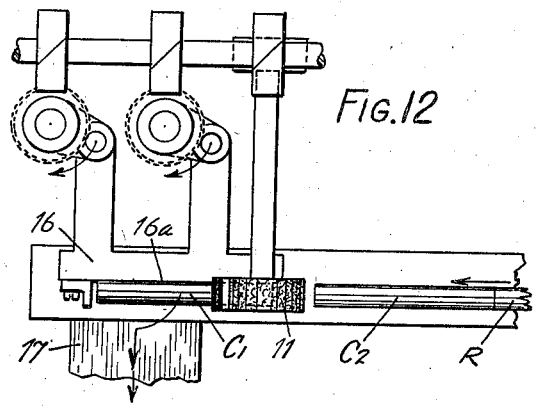
Fig. 12 is a schematic plan view of the preferred type of collector, showing the cigarette after it has been accelerated by the cam roller, and about to be pushed into the space between the collecting belt and the friction roller.
Figure 13:
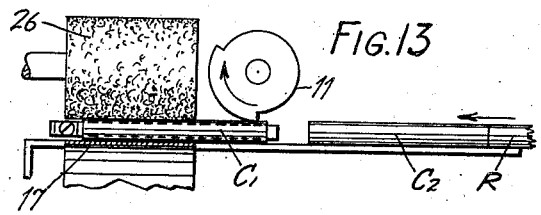
Fig. 13 is a front view of the same.

In Figs. 8 and 9, what is assumed to be the foremost cigarette C, severed from the cigarette rod R, is shown being pushed by the cigarette rod and about to move under the roll 11, the raised segment 11a at this time being above the shaft 12 and thus allowing the cigarette C to advance until it has reached a position as indicated in Figs. 10 and 11, at which the raised segment 11a on roll 11 is just engaging with the top of the cigarette. Since the peripheral speed of pusher segment 11a is greater than the linear speed of the cigarette rod R, the cigarette C1 is speeded up and a space is established between it and the next cigarette C2, as indicated in Figs. 12 and 13. When the raised segment 11a of the roll 11 has released the cigarette C1 the front face 16a of pusher 16, which during the period of advance of the cigarette C1 has been pursuing its orbital motion, reaches the position where it is lined up against the side of the cigarette. Thereupon, as the pusher 16 continues on its orbital path, it pushes the cigarette into the space between the transverse collecting belt 17 and the friction roller 26, as shown in Figs. 14 and 15.

Figure 14:
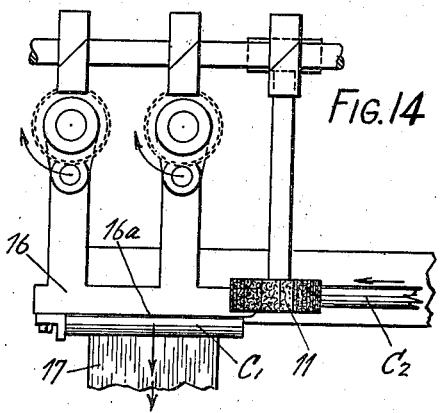
Fig. 14 is a schematic plan view of the same, showing the first cigarette gripped between collecting belt and friction roller, and a second cigarette about to be engaged by the raised segment of the "speed-up" roll.
Figure 15:
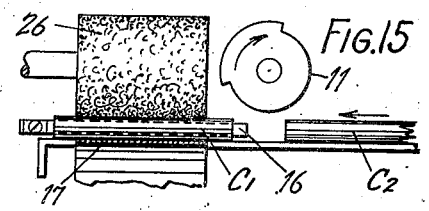
Fig. 15 is a front view of Fig. 14.

The following cigarette C2, Figs. 14 and 15, is now in the same position as the cigarette C1 was, Figs. 8 and 9, in the cycle just described, and it will pass through the same operations as did cigarette C1, and so will all subsequent cigarettes so long as the cigarette rod keeps feeding them into the catcher.

On the front face 16a of the pusher 16 there is provided an abutment 16b which will serve to stop cigarettes having an excessive momentum. The excessive momentum of the cigarettes may result from various causes which produce an abnormally high speed of the cigarettes, and need not be enumerated herein. Therefore, when the cigarette is propelled with an abnormally high velocity by the roll 11, instead of traveling beyond the pusher 16 its axial motion will be stopped by the abutment 16b while it is being inserted by the latter between the collecting belt and friction roller. Abutment 16b is adjustably secured to the pusher 16 so as to permit of being set in the proper position for cigarettes of different lengths.

Bracket 30, which provides a bearing for the shaft 12 on which the roll 11 is mounted, is hinged on shaft 15, and an adjusting screw 31 in a lug 32 thereof abuts a ledge 33 on the frame 34. By turning the screw 31 right or left the space between the stationary table or plate 35 and roll 11 can be adjusted to suit cigarettes of different diameter. It should be noted that the plate 17a guides the cigarettes under the roll 11 and into position to be delivered between the collecting belt 17 and friction roller by the pusher 16.

Bracket 35, which provides a bearing for a shaft 26a on which the roller 26 is mounted, is similarly hinged, and by turning a set screw 36 threaded in lug 35a and abutting a ledge 34b on frame 34 adjustment for cigarettes of different diameter can be made.

Both bracket 30 and bracket 35 can be swung out of the way so as to leave plenty of room for inspection and cleaning. No disturbance in timing will be caused by swinging these brackets as the trains of gears which drive the rollers 11 and 26 always remain in mesh.

Figs. 16 to 20 illustrate schematically a modified form of the invention designed to advance two cigarettes at a time. Figs. 16 and 17 show the foremost pair of cigarettes C1 and C2 being advanced into the catcher and the raised segment of the "speed-up" roll 111 just making contact with the second cigarette C2. Since the peripheral speed of the raised segment of the roll 111 is greater than the linear speed of the cigarette rod it accelerates the cigarettes C1 and C2 and establishes the desired space between the cigarette C2 and the next cigarette C3, as shown in Figs. 18 and 19. When the roll 111 is about to release the cigarette C2 the movement of the pusher 16 brings its front face 16a up against the two cigarettes, whereby as it continues its orbital motion it pushes the two cigarettes into the space between the diverging collecting belts 117a and 117b and the friction rollers 126, as indicated in Fig. 20.

As shown in Figs. 11 and 13 and Figs. 17 and 19, the segments on the speed-up rolls 11a and 111a are less in peripheral length than the length of the cigarette and in their rotation engage the cigarettes back of their forward ends and release them ahead of their rearward ends, thus engaging the body of the cigarette and avoiding pressure on the more delicate ends of the cigarette.

In Fig. 20 there is also shown how the rows of cigarettes are separated as they are advanced on the two diverging collecting belts 117a and 117b so that they are delivered to the secondary collecting belt 150 in two separate lanes. The use of separate and diverging collecting belts is not a necessary feature of this invention but it possesses several advantages which have already been mentioned above.

The cigarettes on the collecting belt 17 of the embodiment of the invention illustrated in Figs. 1 to 16, inclusive, may be delivered to a secondary collecting belt (not shown) which carries them against a stationary stop (not shown), whereby the cigarettes form a plurality of stacked layers on the secondary collecting belt. In a similar manner the two rows of cigarettes on the secondary collecting belt 150 (Fig. 20) may be advanced against a stationary stop (not shown) to stack the cigarettes in a plurality of layers thereon. This arrangement of primary and secondary collecting belts is shown in Patent No. 1,885,892, granted November 1, 1932, on the application of Wilhelm B. Bronander.

While as illustrated the roll 26 is driven at the same surface speed as the belt 17 because it is preferred to maintain the seam of all cigarettes up for inspection purposes, it should be understood that the roll 26 need not be driven but could be left free to be rotated by the engagement of the cigarettes, or in fact it could be held immovable to utilize only the small portion of its periphery adjacent the belt, since the cigarettes would still be frictionally engaged so as to retard their longitudinal movement.

What is claimed is:

1. A cigarette collector comprising mechanism arranged to receive cigarettes delivered lengthwise in end-to-end relation from a continuous rod cigarette machine cutoff and separate them lengthwise, collecting means arranged transversely of the line of cigarettes delivered from the cutoff, a traveling friction surface overlying said collecting means to engage cigarettes thereon, and a device for pushing the separated cigarettes sidewise between said collecting means and traveling surface, whereby the axial motion of the cigarettes will be gently retarded and stopped.

2. A cigarette collector comprising mechanism arranged to receive cigarettes delivered lengthwise in end-to-end relation from a continuous rod cigarette machine cutoff and separate them lengthwise, collecting means arranged transversely of the line of cigarettes delivered from the cutoff, a traveling friction surface overlying said collecting means to engage cigarettes thereon, and a device for pushing the separated cigarettes sidewise between said collecting means and traveling surface, whereby the axial motion of the cigarettes will be gently retarded and stopped, said mechanism including a stationary plate on which the cigarettes delivered from the cutoff are guided, and a rotating roll having a segment of increased radius adapted to engage the top of each cigarette delivered onto said plate from the cutoff and accelerate it to separate it from the following cigarette.

3. A cigarette collector comprising mechanism arranged to receive cigarettes delivered lengthwise in end-to-end relation from a continuous rod cigarette machine cutoff and separate them lengthwise, collecting means arranged transversely of the line of cigarettes delivered from the cutoff, a traveling friction surface overlying said collecting means to engage cigarettes thereon, and a device for pushing the separate cigarettes sidewise between said collecting means and traveling surface, whereby the axial motion of the cigarettes will be gently retarded and stopped, said mechanism including a stationary plate on which the cigarettes delivered from the cutoff are guided, and a rotating roll having a segment of increased radius adapted to engage the top of alternate cigarettes delivered onto said plate from the cutoff and accelerate and separate pairs of cigarettes from the following cigarettes.

4. A cigarette collector comprising mechanism arranged to receive cigarettes delivered lengthwise in end-to-end relation from a continuous rod cigarette machine cutoff and separate them lengthwise, collecting means arranged transversely of the line of cigarettes delivered from the cutoff, a traveling friction surface overlying said collecting means to engage cigarettes thereon, and a device for pushing the separated cigarettes sidewise between said collecting means and traveling surface, whereby the axial motion of the cigarettes will be gently retarded and stopped, said collecting means including a traveling endless belt, and said friction surface including a rotary friction roller spaced above the belt a distance slightly less than the diameter of a cigarette pushed into said space by said device will be gradually gripped and retarded.

5. A cigarette collector comprising mechanism arranged to receive cigarettes delivered lengthwise in end-to-end relation from a continuous rod cigarette machine cutoff and separate them lengthwise, collecting means arranged transversely of the line of cigarettes delivered from the cutoff, a traveling friction surface overlying said collecting means to engage cigarettes thereon, and a device for pushing pairs of the separated cigarettes sidewise between said collecting means and traveling surface, whereby the axial motion of the cigarettes will be gently retarded and stopped, said collecting means including a plurality of traveling endless belts, and said frictional surface including a pair of rotary friction rollers spaced above the belts a distance less than the diameter of a cigarette so that a pair of cigarettes pushed into said space by said device will be gradually gripped and retarded.

6. A cigarette collector comprising mechanism arranged to receive cigarettes delivered lengthwise in end-to-end relation from a continuous rod cigarette machine cutoff and separate them lengthwise, collecting means arranged transversely of the line of cigarettes delivered from the cutoff, a traveling friction surface overlying said collecting means to engage cigarettes thereon, and a device for pushing the separated cigarettes sidewise between said collecting means and traveling surface, whereby the axial motion of the cigarettes will be gently retarded and stopped, said device including a pair of crank shafts, cranks on said shafts, and a pusher pivotally connected to said cranks and adapted to push the separated cigarettes sidewise between the collecting means and traveling surface.

7. A cigarette collector comprising mechanism arranged to receive cigarettes delivered lengthwise in end-to-end relation from a continuous rod cigarette machine cutoff and separate them lengthwise, collecting means arranged transversely of the line of cigarettes delivered from the cutoff, a traveling friction surface overlying said collecting means to engage cigarettes thereon, and a device for pushing the separated cigarettes sidewise between said collecting means and traveling surface, whereby the axial motion of the cigarettes will be gently retarded and stopped, said device including a pair of crank shafts, cranks on said shafts, a pusher pivotally connected to said cranks and adapted to push the separated cigarettes sidewise between the collecting means and traveling surface, and an abutment on said pusher arranged to stop cigarettes having an excessive momentum.

8. A cigarette collector comprising mechanism arranged to receive cigarettes delivered lengthwise in end-to-end relation from a continuous rod cigarette machine cutoff and separate them lengthwise, collecting means arranged transversely of the line of cigarettes delivered from the cutoff, a traveling friction surface overlying said collecting means to engage cigarettes thereon, and a device for pushing pairs of the separated cigarettes sidewise between said collecting means and traveling surface, whereby the axial motion of the cigarettes will be gently retarded and stopped, said device including a pair of crank shafts, cranks on said shafts, and a pusher pivotally connected to said cranks and adapted to push separated pairs of cigarettes sidewise between the collecting means and traveling surface.

9. A cigarette collector comprising mechanism arranged to receive cigarettes delivered lengthwise in end-to-end relation from a continuous rod cigarette machine cutoff and separate them lengthwise, collecting means arranged transversely of the line of cigarettes delivered from the cutoff, a traveling friction surface overlying said collecting means to engage cigarettes thereon, and a device for pushing pairs of the separated cigarettes sidewise between said collecting means and traveling surface, whereby the axial motion of the cigarettes will be gently retarded and stopped, said device including a pair of crank shafts, cranks on said shafts, a pusher pivotally connected to said cranks and adapted to push separated pairs of cigarettes sidewise between the collecting means and traveling surface, and an abutment on said pusher arranged to stop cigarettes having an excessive momentum.

10. In a cigarette collector for collecting tipped cigarettes, the combination with mechanism arranged to receive tipped cigarettes delivered lengthwise in end-to-end relation from a continuous rod cigarette machine cutoff and separate them lengthwise in pairs, of a pair of diverging collecting belts arranged obliquely of the line of cigarettes delivered from the cutoff, a pair of traveling frictional surfaces overlying said conveyors to engage cigarettes thereon, and a device for pushing the separated pairs of cigarettes sidewise between the collecting belts and traveling surfaces, whereby the axial motion of the cigarettes will be gently retarded and stopped and the cigarettes will be collected in two rows in side-by-side formation with the tipped ends of the cigarettes in each row all facing in the same direction.

11. In a cigarette collector for collecting tipped cigarettes, the combination with mechanism arranged to receive tipped cigarettes delivered lengthwise in end-to-end relation from a continuous rod cigarette machine cutoff and separate them lengthwise in pairs, of a pair of diverging collecting belts arranged obliquely of the line of cigarettes delivered from the cutoff, a pair of traveling friction surfaces overlying said conveyors to engage cigarettes thereon, and a device for pushing the separated pairs of cigarettes sidewise between the collecting belts and traveling surfaces, whereby the axial motion of the cigarettes will be gently retarded and stopped and the cigarettes will be collected in two rows in side-by-side formation with the tipped ends of the cigarettes in each row all facing in the same direction, said mechanism including a stationary plate on which the cigarettes delivered from the cutoff are guided, and a rotating roll having a segment of increased radius adapted to engage the top of alternate cigarettes delivered onto said plate from the cutoff and accelerate and separate pairs of cigarettes from the following cigarettes.

12. In a cigarette collector for collecting tipped cigarettes, the combination with mechanism arranged to receive tipped cigarettes delivered lengthwise in end-to-end relation from a continuous rod cigarette machine cutoff and separate them lengthwise in pairs, of a pair of diverging collecting belts arranged obliquely of the line of cigarettes delivered from the cutoff, a pair of traveling friction surfaces overlying said conveyors to engage cigarettes thereon, and a device for pushing the separated pairs of cigarettes sidewise between the collecting belts and traveling surfaces, whereby the axial motion of the cigarettes will be gently retarded and stopped and the cigarettes will be collected in two rows in side-by-side formation with the tipped ends of the cigarettes in each row all facing in the same direction, said friction surfaces including a pair of rotary friction rollers spaced above the collecting belts a distance slightly less than the diameter of a cigarette so that the pair of cigarettes pushed into said space by said device will be gradually gripped and retarded.

13. In a cigarette collector for collecting tipped cigarettes, the combination with mechanism arranged to receive tipped cigarettes delivered lengthwise in end-to-end relation from a continuous rod cigarette machine cutoff and separate them lengthwise in pairs, of a pair of diverging collecting belts arranged obliquely of the line of cigarettes delivered from the cutoff, a pair of traveling friction surfaces overlying said conveyors to engage cigarettes thereon, and a device for pushing the separated pairs of cigarettes sidewise between the collecting belts and traveling surfaces, whereby the axial motion of the cigarettes will be gently retarded and stopped and the cigarettes will be collected in two rows in side-by-side formation with the tipped ends of the cigarettes in each row all facing in the same direction, said device including a pair of crank shafts, a pair of cranks on said shafts, and a pusher pivotally connected to said cranks and adapted to push the separated pairs of cigarettes sidewise between said collecting belts and friction rollers.

14. In a cigarette collector for collecting tipped cigarettes, the combination with mechanism arranged to receive tipped cigarettes delivered lengthwise in end-to-end relation from a continuous rod cigarette machine cutoff and separate them lengthwise in pairs, of a pair of diverging collecting belts arranged obliquely of the line of cigarettes delivered from the cutoff, a pair of traveling friction surfaces overlying said conveyors to engage cigarettes thereon, and a device for pushing the separated pairs of cigarettes sidewise between the collecting belts and traveling surfaces, whereby the axial motion of the cigarettes will be gently retarded and stopped and the cigarettes will be collected in two rows in side-by-side formation with the tipped ends of the cigarettes in each row all facing in the same direction, said device including a pair of crank shafts, a pair of cranks on said shafts, a pusher pivotally connected to said cranks and adapted to push the separated pairs of cigarettes sidewise between said collecting belts and friction rollers, and an abutment on said pusher adapted to stop cigarettes having an excessive momentum.

15. The combination with a stationary plate arranged to guide cigarettes delivered lengthwise in end-to-end relation from a continuous rod cigarette machine cutoff, collecting means arranged transversely of the line of cigarettes delivered from the cutoff, a traveling friction surface overlying said collecting means to engage cigarettes thereon, and a device for pushing the cigarettes on said plate sidewise between said collecting means and traveling surface.

16. Mechanism arranged to receive cigarettes delivered in end-to-end relation from a continuous rod cigarette machine cutoff and separate them in pairs lengthwise, including a stationary plate on which the cigarettes delivered from the cutoff are guided, and a rotating roll having a segment of increased radius adapted to engage the top of alternate cigarettes delivered onto said plate from the cutoff and accelerate and separate pairs of cigarettes from the following cigarettes.

17. A device for pushing traveling cigarettes sidewise, including a pair of crank shafts, cranks on said shafts, a pusher pivotally connected to said cranks and adapted to push cigarettes sidewise, and an abutment on said pusher arranged to stop cigarettes having an excessive momentum.

18. A device for pushing sidewise cigarettes traveling endwise in a line, including a pusher having a cigarette engaging surface, and means for giving said pusher a sidewise movement to push the cigarettes and also a movement in the direction of travel of said line, and an abutment on said pusher in the path of movement of cigarettes sliding longitudinally along said surface as they are being pushed sidewise.

19. A cigarette collector comprising mechanism arranged to receive cigarettes delivered lengthwise in end to end relation from a continuous rod cigarette machine cutoff, endless collecting means having a continuous operating surface arranged transversely of and in the same plane as the line of cigarettes delivered from the cutoff and a friction surface overlying said collecting means to grip cigarettes between said continuous surface and said friction surface, and a device for pushing the cigarettes sidewise between said collecting means and friction surface, whereby the axial motion of the cigarettes will be retarded.

20. A cigarette collector comprising a moving segmental roll arranged to engage the cigarettes delivered lengthwise in end to end relation from a continuous rod cigarette machine cutoff and space them lengthwise, of a device for displacing the separated cigarettes sidewise from said line, and means operating said device in timed relation to the operation of said roll to engage and displace the separated cigarettes just as the same are released by said roll, to maintain control of the cigarette.

21. A cigarette collector for continuous rod cigarette machine from which cigarettes are delivered lengthwise in a line, means moving the cigarettes out of said line in multiples, and mechanism conveying the multiples away from said means in rows and causing a separation between the adjacent ends of the cigarettes of said rows.

22. A cigarette collector comprising mechanism arranged to receive cigarettes delivered lengthwise in end to end relation from a continuous rod cigarette machine cutoff and separate them lengthwise, a traveling belt arranged for movement transversely of the line of cigarettes delivered from the cutoff, a member having a friction surface arranged to press cigarettes against said traveling belt and a transversely moving device having a portion entering between said surface and belt to engage a cigarette up to the point where said cigarette is gripped between said surface and belt for positively pushing the separated cigarettes sidewise between said traveling belt and surface whereby the lengthwise movement of the cigarettes will be retarded.

23. In a double cigarette collector for continuous rod cigarette machines from which cigarettes issue in an endwise moving line, a cigarette separator for separating a pair of cigarettes as a unit from the remaining cigarettes of the line, including a cigarette engaging element traveling at a speed greater than the rod and engaging every other cigarette only, and a pusher moving transversely of said line to displace said separated pair from said line.

24. In a cigarette collector for collecting tipped cigarettes, the combination with mechanism arranged to receive cigarettes delivered lengthwise in end to end relation from a continuous rod cigarette machine cutoff and separate them lengthwise in pairs, of transverse conveyor means arranged at right angles to the line of cigarettes, means having a friction surface overlying said conveyor to engage cigarettes thereon, and a device for pushing the separated cigarettes sidewise between the conveyor and said surface whereby the lengthwise motion of said cigarettes will be retarded and the cigarettes will be collected in two rows with the tipped ends of the cigarettes in any one row facing in the same direction.

25. A cigarette collector comprising mechanism arranged to receive cigarettes delivered lengthwise in a line from a continuous rod cigarette machine cutoff, mechanism for moving cigarettes sidewise from said line, means into which the cigarettes are displaced by said mechanism for arresting both the lengthwise and sidewise movements of the cigarettes, said means including opposed cigarette gripping surfaces, and means for giving said surfaces substantially equal movement in the same direction to retain a predetermined position of the paper seam of successive cigarettes.

26. In a cigarette catcher, the combination with means arranged to receive cigarettes in end-to-end relation from a cigarette machine cut-off and accelerate them to separate them lengthwise, of mechanism for moving the separated cigarettes sidewise, and means for retarding the longitudinal movement of the cigarettes while they are moved sidewise including members providing opposed friction surfaces one of which travels transversely of the rod and the other of which is immovable between which the cigarettes are gripped.

27. A cigarette collector for collecting cigarettes delivered in an endwise moving line from a continuous rod cigarette machine, comprising a transversely moving element for delivering successive cigarettes sidewise from said line, spaced members having opposed surfaces spaced less than a cigarette diameter apart arranged on opposite sides of the path of the cigarette delivered sidewise by said member to grip the cigarette between them and thus frictionally retard its longitudinal movement, one of said members having its operating portion provided with a relatively thick layer of compressible material.

28. A cigarette collector for collecting cigarettes delivered in an endwise moving line from a continuous rod cigarette machine, comprising a transversely moving element for delivering successive cigarettes sidewise from said line, spaced members having opposed surfaces spaced less than a cigarette diameter apart arranged on opposite sides of the path of the cigarette delivered sidewise by said member to grip the cigarette between them and thus frictionally retard its longitudinal movement, one of said members being formed of a relatively compressible material, said material consisting of rubber.

29. A cigarette collector comprising a stationary plate arranged to receive and support the cigarettes delivered lengthwise in end to end relation from a continuous rod cigarette machine cutoff, a roll rotating at a peripheral speed greater than that of the cigarette rod arranged in overlying relation to said plate to engage the cigarettes resting thereon to space them lengthwise, a device for displacing the cigarettes sidewise from said line and means operating said device in timed relation to the operation of said roll.

30. A cigarette collector comprising in combination a stationary cigarette supporting plate arranged to receive cigarettes in line as they are delivered from the cutoff of a continuous rod cigarette machine, a cigarette displacer, means imparting motion to said displacer transverse to the line of travel of the cigarettes to displace them sidewise from said line and a moving spacer element arranged above said plate in position to engage the cigarettes in said line and slide them along said plate into the range of action of said pusher, said element having a cigarette engaging surface with relatively high coefficient of friction as compared with said plate, and means for driving said element at a surface speed greater than rod speed to separate the cigarettes.

31. A cigarette collector comprising in combination a stationary cigarette supporting plate arranged to receive cigarettes in line as they are delivered from the cutoff of a continuous rod cigarette machine, a cigarette displacer, means imparting motion to said displacer transverse to the line of travel of the cigarettes to displace them sidewise from said line and a moving spacer element arranged above said plate in position to engage the cigarettes in said line and slide them along said plate into the range of action of said pusher, said element having a cigarette engaging surface with relatively high coefficient of friction as compared with said plate, and means for driving said element at a surface speed greater than rod speed to separate the cigarettes, said element comprising a roller having its cigarette engaging periphery formed of yieldable material.

32. Means for accelerating cigarettes delivered endwise from a cigarette machine cutoff, comprising a longitudinally extending stationary plate for supporting the endwise moving cigarettes and a rotating roll having a raised segment adapted to engage and lightly grip each cigarette against said stationary support behind the leading end of the cigarette and disengage it in front of its trailing end, and means for rotating said roll at a peripheral speed greater than the rod speed of the cigarette machine.

33. In a cigarette machine in which cigarettes are delivered in an endwise moving line, the combination with means affording a support for the cigarettes adjacent said line, of a member having a cigarette engaging portion moving transversely relative to said line and being formed of rubber for yieldingly engaging and frictionally gripping the cigarettes against said support while imparting a movement to the same transversely relative to said line, and means for moving the longitudinal traveling cigarettes from said line directly into the range of action of said member to frictionally retard the longitudinal movement thereof.

GEORGE W. GWINN.
JAMES W. LEARY.